US009852075B2

(12) United States Patent
Andre et al.

(10) Patent No.: US 9,852,075 B2
(45) Date of Patent: Dec. 26, 2017

(54) ALLOCATE A SEGMENT OF A BUFFER TO EACH OF A PLURALITY OF THREADS TO USE FOR WRITING DATA

(71) Applicant: INTERNATIONAL BUSINESS MACHINES CORPORATION, Armonk, NY (US)

(72) Inventors: Herve G. P. Andre, Orlando, FL (US); Juan J. Ruiz, Daly City, CA (US); Trung N. Nguyen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/947,686

(22) Filed: Nov. 20, 2015

(65) Prior Publication Data

US 2017/0147494 A1   May 25, 2017

(51) Int. Cl.
*G06F 12/02* (2006.01)
*G06F 12/0864* (2016.01)

(52) U.S. Cl.
CPC .... *G06F 12/0864* (2013.01); *G06F 2212/604* (2013.01)

(58) Field of Classification Search
None
See application file for complete search history.

(56) References Cited

U.S. PATENT DOCUMENTS

| | | | |
|---|---|---|---|
| 6,094,712 A * | 7/2000 | Follett | G06F 9/546 370/412 |
| 6,757,273 B1 | 6/2004 | Hsu et al. | |
| 6,845,430 B2 * | 1/2005 | Hopeman | G06F 12/084 707/999.202 |
| 6,862,635 B1 | 3/2005 | Alverson et al. | |
| 7,146,458 B2 | 12/2006 | Smirnov et al. | |
| 7,528,838 B2 | 5/2009 | Gosalia et al. | |
| 8,904,067 B2 | 12/2014 | Saputra | |
| 8,929,213 B2 | 1/2015 | Chrysos et al. | |

(Continued)

FOREIGN PATENT DOCUMENTS

EP    2593861 A1    5/2013

OTHER PUBLICATIONS

Notice of Allowance dated Apr. 19, 2016, pp. 16, for U.S. Appl. No. 14/947,734, filed Nov. 20, 2015.

(Continued)

*Primary Examiner* — Brian Peugh
*Assistant Examiner* — Dustin Bone
(74) *Attorney, Agent, or Firm* — David W. Victor; Konrad Raynes Davda & Victor LLP

(57) ABSTRACT

Provided are a computer program product, system, and method to allocate a segment of a buffer to each of a plurality of threads to use for writing data. Each of a plurality of threads are assigned to one of a plurality of segments in a buffer, wherein the threads write to the segment to which they are assigned. A free segment list indicates segments which are not assigned to one of the threads. In response to one of the segments assigned to one of the threads becoming a full segment having less than a threshold amount of free space, indicating the full segment assigned to the thread in the free segment list and assigning one of the segments in the free segment list to the thread different from the full segment.

19 Claims, 4 Drawing Sheets

(56) References Cited

U.S. PATENT DOCUMENTS

| | | | | |
|---|---|---|---|---|
| 9,003,131 | B1* | 4/2015 | Lunev | G06F 3/0668 711/147 |
| 9,026,735 | B1 | 5/2015 | Torok et al. | |
| 9,055,009 | B2 | 6/2015 | Chrysos et al. | |
| 9,197,686 | B1* | 11/2015 | Kirkby | H04L 65/60 |
| 9,286,328 | B2 | 3/2016 | Kozin et al. | |
| 9,442,674 | B1 | 9/2016 | Andre et al. | |
| 9,483,410 | B1 | 11/2016 | Andre et al. | |
| 2004/0004970 | A1* | 1/2004 | Lakshmanamurthy | H04L 49/90 370/412 |
| 2006/0225078 | A1 | 10/2006 | Anderson | |
| 2007/0140122 | A1* | 6/2007 | Murthy | H04L 69/12 370/231 |
| 2010/0153634 | A1 | 6/2010 | Fellinger et al. | |
| 2010/0323742 | A1 | 12/2010 | Allen et al. | |
| 2010/0332755 | A1 | 12/2010 | Bu et al. | |
| 2012/0017214 | A1* | 1/2012 | Shannon | G06F 9/30134 718/100 |
| 2013/0051478 | A1* | 2/2013 | Wu | H04N 19/159 375/240.25 |
| 2013/0077491 | A1 | 3/2013 | Cherian et al. | |
| 2013/0246775 | A1* | 9/2013 | Bradbury | G06F 9/3005 712/227 |
| 2014/0181794 | A1* | 6/2014 | Grawrock | G06F 11/36 717/128 |
| 2014/0282454 | A1* | 9/2014 | Bai | G06F 8/433 717/157 |
| 2015/0039840 | A1* | 2/2015 | Chandra | G06F 12/00 711/147 |
| 2015/0370717 | A1* | 12/2015 | Godard | G06F 12/0875 711/125 |

OTHER PUBLICATIONS

List of Patents or Patent Applications Treated as Related, dated Nov. 20, 2015, pp. 2.
U.S. Appl. No. 14/947,734, filed Nov. 20, 2015.
U.S. Appl. No. 14/947,468, filed Nov. 20, 2015.
U.S. Appl. No. 14/947,521, filed Nov. 20, 2015.
Office Action dated Mar. 31, 2016, pp. 13, for U.S. Appl. No. 14/947,468, filed Nov. 20, 2015.
Office Action dated Apr. 4, 2016, pp. 14, for U.S. Appl. No. 14/947,521, filed Nov. 20, 2015.
List of Patents or Patent Applications Treated as Related, dated Aug. 23, 2016, pp. 2.
Notice of Allowance dated Jul. 15, 2016, pp. 15, for U.S. Appl. No. 14/947,468, filed Nov. 20, 2015.
Notice of Allowance dated May 31, 2016, pp. 8, for U.S. Appl. No. 14/947,734, filed Nov. 20, 2015.
Response dated Jun. 30, 2016, pp. 12, to Office Action dated Mar. 31, 2016, pp. 13, for U.S. Appl. No. 14/947,468, filed Nov. 20, 2015.
Response dated Jun. 6, 2016, pp. 17, to Office Action dated Apr. 4, 2016, pp. 14, for U.S. Appl. No. 14/947,521, filed Nov. 20, 2015.
Notice of Allowance dated Sep. 28, 2016, pp. 27, for U.S. Appl. No. 14/947,521, filed Nov. 20, 2015.
U.S. Appl. No. 15/240,856, filed Aug. 18, 2016.
Preliminary Amendment dated Aug. 18, 2016, pp. 7, for U.S. Appl. No. 15/240,856, filed Aug. 18, 2016.
Office Action dated Nov. 18, 2016, pp. 12, for U.S. Appl. No. 15/240,856, filed Aug. 18, 2016.
Response dated Feb. 21, 2017, pp. 9 to Office Action dated Nov. 18, 2016, pp. 12, for U.S. Appl. No. 15/240,856, filed Aug. 18, 2016.
Final Office Action dated Apr. 20, 2017, pp. 13, for U.S. Appl. No. 15/240,856, filed Aug. 18, 2016.
Response dated Jun. 8, 2017, pp. 7 to Final Office Action dated Apr. 20, 2017, pp. 13, for U.S. Appl. No. 15/240,856, filed Aug. 18, 2016.
Notice of Allowance dated Jun. 20, 2017, pp. 5, for U.S. Appl. No. 15/240,856, filed Aug. 18, 2016.

* cited by examiner

Segment Information

Trace Data Instance

ALLOCATE A SEGMENT OF A BUFFER TO EACH OF A PLURALITY OF THREADS TO USE FOR WRITING DATA

BACKGROUND OF THE INVENTION

1. Field of the Invention

The present invention relates to a computer program product, system, and method to allocate a segment of a buffer to each of a plurality of threads to use for writing data.

2. Description of the Related Art

Multiple threads executing a program may generate trace data having information on program execution which is written to a shared circular buffer. Trace data may be collected when an error is detected or may be collected as a result of trace code added to programs to collect certain information on program execution, such as the contents of memory and variables, resulting from program execution. Trace data may be used for debugging errors in the program code.

When writing the trace data to the shared circular buffer, the threads need to acquire a lock to access the shared circular buffer to serialize access. To minimize lock contention, task operations may be optimized to just perform critical operations such as claiming the amount of space currently needed and not using that space until after the lock has been relinquished. In this way, lock contention is reduced by reducing the number of tasks subject to lock contention.

Another technique to minimize lock contention involves splitting the buffer into as many circular sub-buffers as there are threads. In this case, no lock is required as each thread has its own sub-buffer.

A further solution is to put the threads into small groups and divide the total buffer into as many sub-buffers as there are groups. One lock is provided per sub-buffer but the number of group members being small enough, efficient use of locking will lessen the collision and thus the wait suffered.

SUMMARY

Provided are a computer program product, system, and method to allocate a segment of a buffer to each of a plurality of threads to use for writing data. Each of a plurality of threads are assigned to one of a plurality of segments in a buffer, wherein the threads write to the segment to which they are assigned. A free segment list indicates segments which are not assigned to one of the threads. In response to one of the segments assigned to one of the threads becoming a full segment having less than a threshold amount of free space, indicating the full segment assigned to the thread in the free segment list and assigning one of the segments in the free segment list to the thread different from the full segment.

DETAILED DESCRIPTION

The above described techniques reduce lock contention by creating sub-buffers of buffer resources for each of the threads or a group of threads. However, by assigning sub-buffer resources to fixed groups of threads, skews in the consumption of buffer resources amongst the threads can lead to inefficient utilization of the sub-buffers, some sub-buffers may wrap quite often while others remain empty or unused. Buffer space allocated to low utilization sub-buffers is not available for use by threads assigned to other high utilization sub-buffers. The low utilization sub-buffers maintain older data that does not get overwritten by their assigned threads, whereas high utilization sub-buffers may have their data frequently overwritten. This results in a buffer time-span differential where high utilization sub-buffers have their more current data overwritten while older data remains in the low utilization sub-buffers which do not have their data overwritten as frequently as the high-utilization buffers.

Described embodiments provide techniques to address these problems by assigning only one segment to a thread, such that threads do not need to obtain a lock to write to their assigned segment, thus eliminating lock contention. Segments not assigned to a thread are indicated in a free segment list. In response to the segment assigned to a thread becoming full (i.e., having less than a threshold amount of free space), the full segment is replaced with one of the segments indicated in the free segment list, so that the thread is assigned a new segment to use from the free segment list.

With these embodiments, threads experiencing high utilization move their full segments to the free segment list where the data remains available on the free segment list until later reassigned to a thread filling a segment and overwritten by the newly assigned thread. The underutilized threads retain their single segment, but the time-span differential is reduced because high utilization threads move their segments to the free segment list where the segment content will available for a longer period of time because the segment must wait to move to the end of the free segment list before being recycled and dispatched to another sub-buffer where it may be overwritten.

Figure 1:
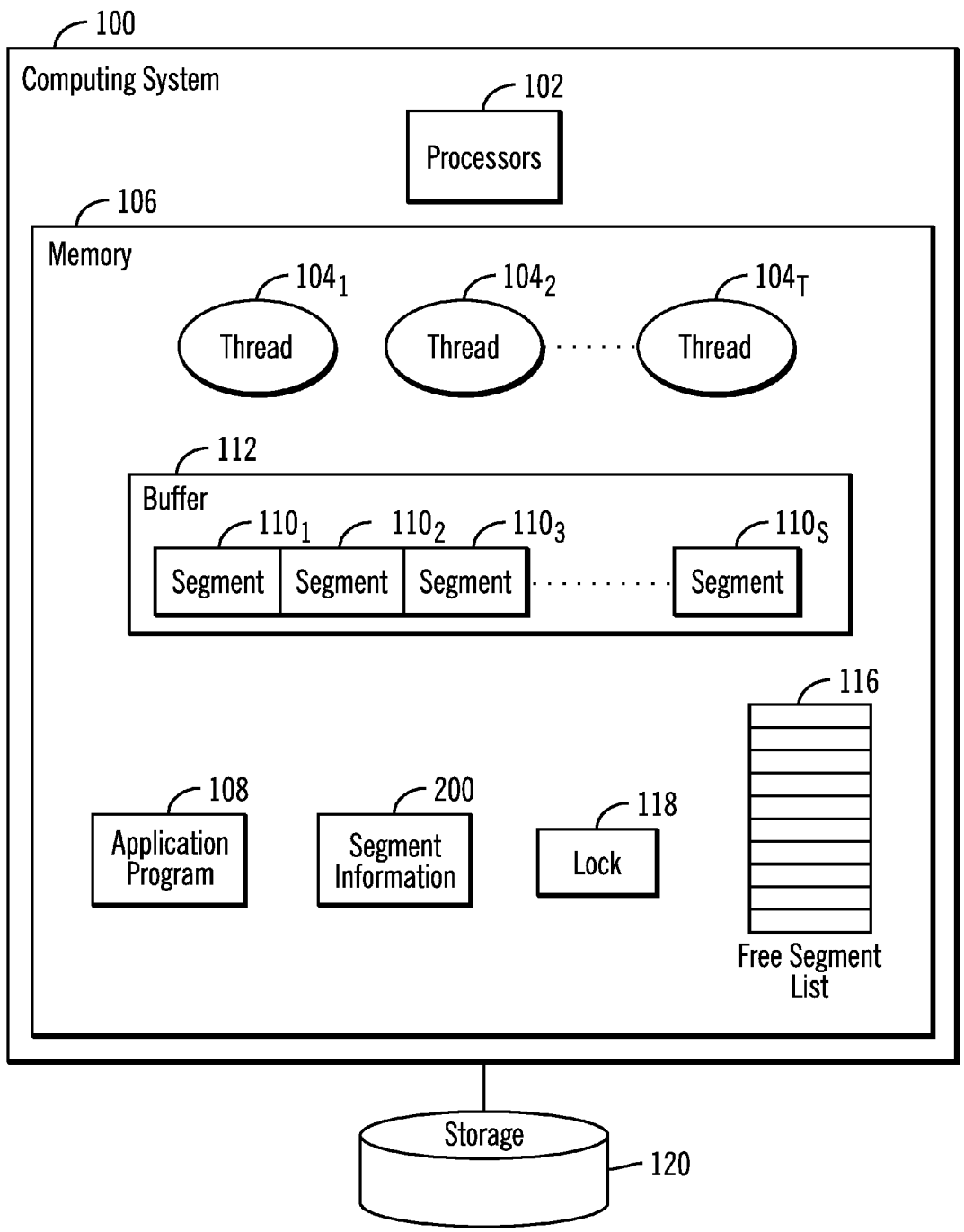
FIG. 1 illustrates an embodiment of a computing environment.

FIG. 1 illustrates an embodiment of a computing environment. A computing system 100 includes one or more processors 102, which may comprise one or more central processing units (CPUs) or a group of multiple cores on a single CPU. The processors 102 may initiate multiple threads $104_1 \ldots 104_T$ in a memory 106, executed by the processors 102, that concurrently execute an application program 108. A thread comprises an independent unit of execution, where different threads may independently submit requests to a same segment of data. Threads may be spawned by threads, where a process may manage and control the operation of multiple threads. The threads $104_1 \ldots 104_T$ may independently execute portions of the application program 108, and may execute portions of the application program 108 in parallel.

The threads $104_1 \ldots 104_T$ write trace dump data to segments $110_1 \ldots 110_s$ of data in a buffer 112 in the memory 106. Trace data may comprise data in memory, errors, log information resulting from the threads $104_1 \ldots 104_T$ executing the application program 108, etc. In alternative embodiments, the threads $104_1 \ldots 104_T$ may write other types of data to the segments $110_1 \ldots 110_s$ other than trace data.

The memory 106 further includes segment information 200 that provides information on assignments of segments $110_1 \ldots 110_s$ to threads $104_1 \ldots 104_T$. In one embodiment, there is only one segment $110_i$ assigned to each of the threads $104_1 \ldots 104_T$. A free segment list 116 indicates those of the segments $110_1 \ldots 110_s$ that are not assigned to threads $104_1 \ldots 104_T$. For instance, there may be a total of S segments and one segment assigned to each of the P threads $104_1 \ldots 104_T$. In certain embodiments, if there is an equal number of segments $110_1 \ldots 110_s$ allocated to the threads $104_1 \ldots 104_T$ as there is in the free segment list 116, then the total number of segments (S) may, in certain embodiments, be equal to 2*P.

In an alternative embodiment, there may be more than one segment assigned to each of the threads $104_1 \ldots 104_T$.

In one embodiment, the free segment list 116 may comprise a First-in-First-Out (FIFO) list where a segment having the most current trace data is added to the head of the FIFO list 116 and segments having the oldest trace data are removed from the tail of the FIFO list 116 and assigned to threads $104_1 \ldots 104_T$. In alternative embodiments, the free segment list 116 may organize data in a different manner than FIFO.

A lock 118 for the free segment list 116 serializes the threads $104_1 \ldots 104_T$ access to the free segment list 116. A thread $104_i$ obtains the lock 118 to replace a full segment $110_{FU}$ assigned to the thread $104_i$ with a free segment $110_{FR}$ from the free segment list 116 and adds the full segment $110_{FU}$ to the free segment list 116 to be reassigned to another thread $104_1 \ldots 104_T$ after all other segments in the free segment list 116 are used. A segment may be deemed full when it has no more available space or less than a threshold amount of free space.

The computing system 100 may further be connected to a storage 120 in which data in the memory 106 may be stored.

The storage 120 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 106 may comprise one or more a suitable volatile or non-volatile memory devices, including Dual In Line Memory Modules (DIMM) and other suitable memory devices, such as those described above described above.

Figure 2:
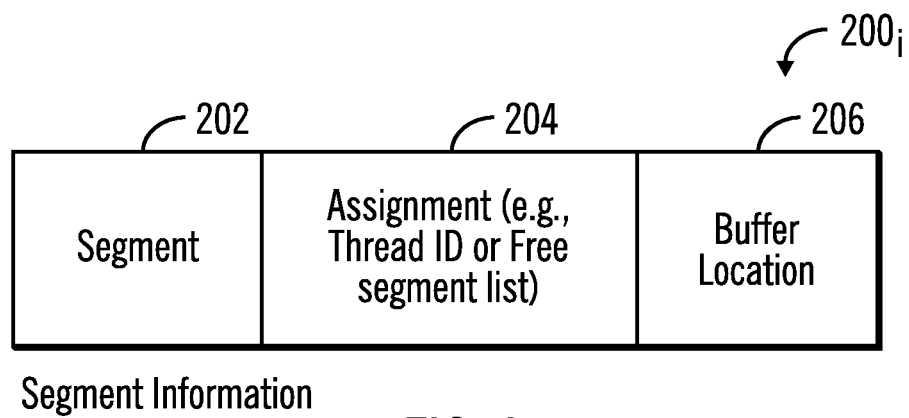
FIG. 2 illustrates an embodiment of segment information.

FIG. 2 illustrates an embodiment of an entry $200_i$ in the segment information 200 including a segment identifier (ID) 202; an assignment 204, where the assignment identifies a thread $104_1 \ldots 104_T$ to which the segment 202 is assigned or the free segment list 116; and a buffer location 206 at which the segment 202 is stored in the buffer 112. The segment information $200_i$ may be maintained with the segments $110_1 \ldots 110_s$ in the buffer 112. In an embodiment where the segment information $200_i$ is not maintained with the segment $110_i$ itself, the buffer location 206 indicates the physical location of the segment $110_i$ (a pointer to the segment) may be included with the segment information $200_i$.

Figure 3:
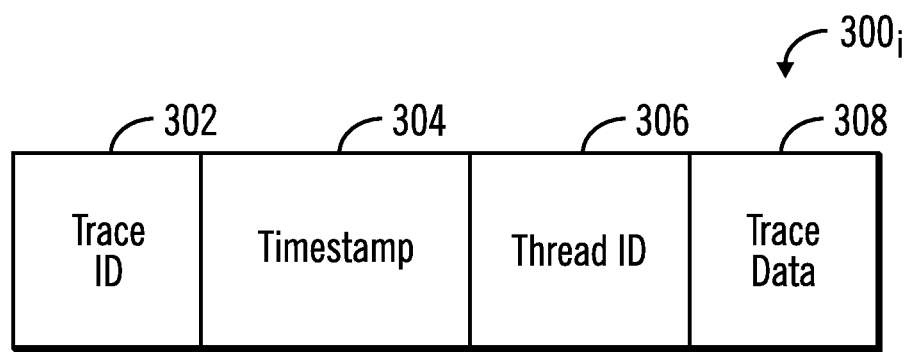
FIG. 3 illustrates an embodiment of an instance of trace data.

FIG. 3 illustrates an embodiment of an instance of trace data 300i written to one of the segments $110_1 \ldots 110_s$, including a trace identifier (ID) 302; a timestamp 304 at which the trace data was generated; a thread ID 306 of the thread $104_1, 104_2 \ldots 104_T$ that generated the trace data, and the trace data 308 providing the output from memory, a program, errors, etc.

Figure 4:
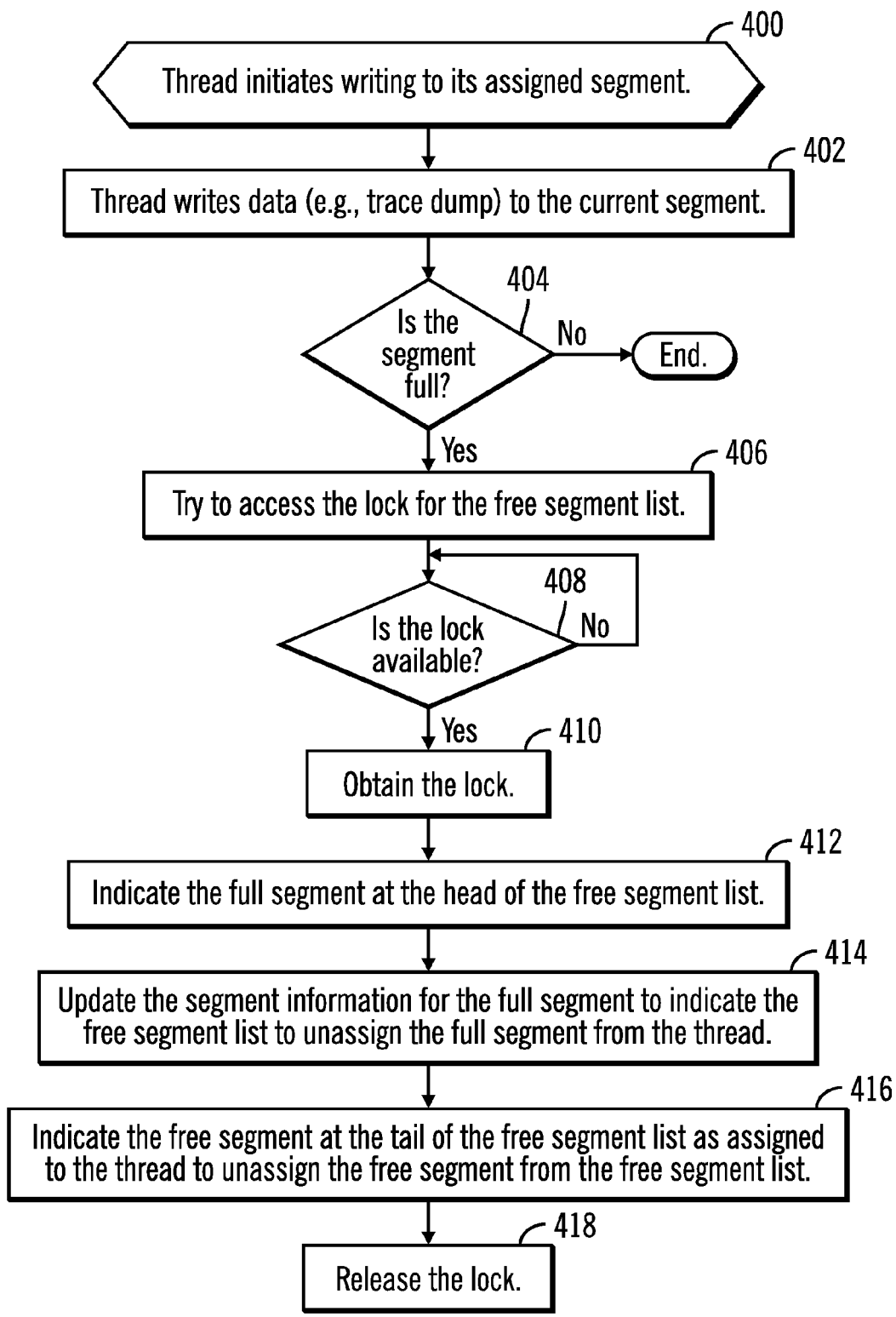
FIG. 4 illustrates an embodiment of operations by a thread to write to an assigned segment.

FIG. 4 illustrates an embodiment of operations performed by a thread $104_i$ comprising one of the threads $104_1 \ldots 104_T$ to write to its assigned segment $110_i$. Upon initiating (at block 400) writing to the assigned segment $110_i$, the thread $104_i$ writes (at block 402) to its assigned segment $110_i$. If (at block 404) the segment $110_i$ is determined to be full, such as before or after writing the trace data, the thread $104_i$ tries (at block 406) to access the lock 118 for the free segment list 116. The thread $104_i$ may request the lock 118 from a lock manager (not shown) or check a lock status to determine if the lock is available and write the lock 118 status indicating it has taken the lock if the lock is available. If (at block 408) the lock 118 is not available, then the thread $104_i$ returns to block 408 to wait for the lock to become available. If (at block 408) the lock 118 is available, then the thread $104_i$ obtains (at block 410) the lock 118, such as by receiving the lock 118 from a lock manager or by writing to a lock 118 status field indicating that the lock is held.

After obtaining the lock 118 to the free segment list 116 (at block 410), the thread $104_i$ indicates (at block 412) the full segment $110_{FU}$ at the head of the free segment list 116. The thread $104_i$ updates (at block 414) the segment information $200_{FU}$ for the full segment $110_{FU}$ to indicate the free segment list 116, which unassigns the full segment $110_{FU}$ from the thread $104_i$. The thread $104_i$ indicates (at block 416) the free segment $110_{FR}$ at the tail end of the free segment list 116 as assigned to the thread $104_i$, such as by updating the assignment 204 in the segment information $200_{FR}$ for the free segment $110_{FR}$ to indicate the thread $104_i$, replacing the assignment to the free segment list 116, thus unassigning the free segment $110_{FR}$ from the free segment list 116. The lock 118 to the free segment list 116 is released (at block 418).

With the described embodiments, each thread $104_1 \ldots 104_T$ is assigned one segment $110_1 \ldots 110_s$ to eliminate lock contention because the threads $104_1 \ldots 104_T$ do not need a lock to access their assigned segment, as there is never a concurrent access to the segment because the $110_1 \ldots 110_s$ do not need a lock to access their assigned segment. Further, by limiting each thread $104_1 \ldots 104_T$ to be assigned one segment, those threads with low utilization will at most tie-up just one segment. Those threads $104_1 \ldots 104_T$ experiencing high activity will always be provided a new segment when needed from the free segment list 116. Further, with described embodiments, the trace data in the segments remains in the segments when the segments are moved to the free segment list 116 and when moved from the free segment list 116 to replace a full segment up until the moment the free segment having trace data re-assigned to a thread is overwritten by the thread. Thus, the trace data 300, remains available for access until the last moment when overwritten after being re-assigned.

Further, by removing full segments from the tail end (having the oldest data) of a FIFO free list 116, the full segments remain available in the free segment list 116 for a maximum amount of time until they are needed for re-assignment to a thread to replace a full segment assigned to that thread. Thus, the use of the free segment list 116 ensures that the newest data in a full segment returned to the free segment list 116 remains available and not overwritten for a maximum time possible.

In the described embodiment, the variable "i", when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
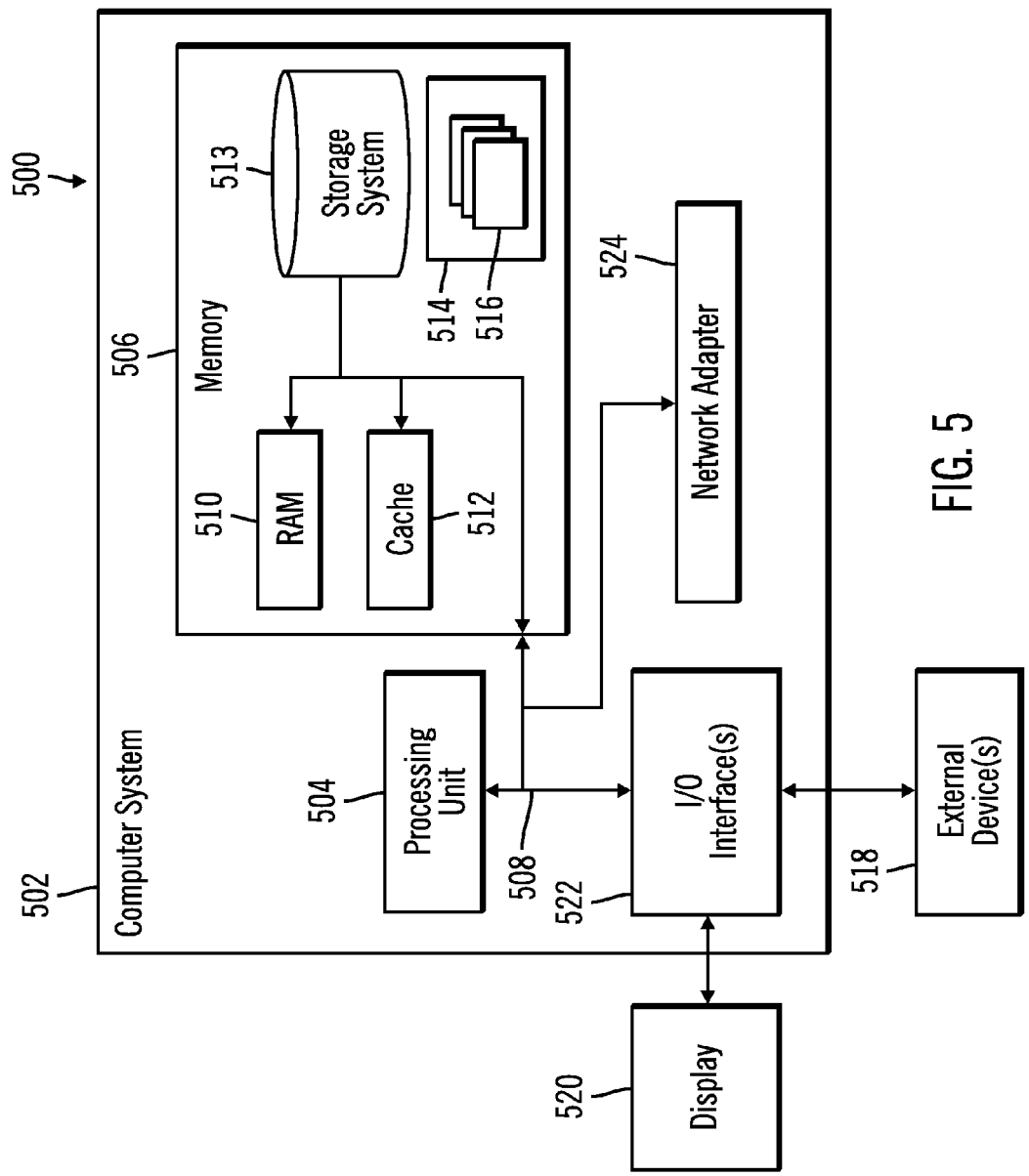
FIG. 5 illustrates a computing environment in which the components of FIG. 1 may be implemented.

The computational components of FIG. 1, including the computing system 100 may be implemented in one or more computer systems, such as the computer system 502 shown in FIG. 5. Computer system/server 502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system/server 502 is shown in the form of a general-purpose computing device. The components of computer system/server 502 may include, but are not limited to, one or more processors or processing units 504, a system memory 506, and a bus 508 that couples various system components including system memory 506 to processor 504. Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 513 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of embodiments of the invention.

Program/utility 514, having a set (at least one) of program modules 516, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. The components of the computer 502 may be implemented as program modules 516 which generally carry out the functions and/or methodologies of embodiments of the invention as described herein. The systems of FIG. 1 may be implemented in one or more computer systems 502, where if they are implemented in multiple computer systems 502, then the computer systems may communicate over a network.

Computer system/server 502 may also communicate with one or more external devices 518 such as a keyboard, a pointing device, a display 520, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 522. Still yet, computer system/server 502 can communicate with one or more networks such as a local area network (LAN), a general wide area network (WAN), and/or a public network (e.g., the Internet) via network adapter 524. As depicted, network adapter 524 communicates with the other components of computer system/server 502 via bus 508. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data written by multiple threads executed by at least one processing unit, the computer program product comprising a computer readable storage medium having computer readable program code embodied therein that when executed performs operations, the operations comprising:
   providing segment information entries in a memory for segments in a buffer;
   providing an assignment of each of a plurality of threads to one of a plurality of segments in the buffer, wherein the threads write to the segment to which they are assigned;
   indicating segments in a free segment list which are not assigned to one of the threads, wherein each segment information entry of the segment information entries in the memory, for each of the segments indicted in the free segment list, indicates that the segment is assigned to the free segment list and a buffer location at which the segment is stored in the buffer; and
   in response to one of the segments assigned to one of the threads becoming a full segment having less than a threshold amount of free space, performing:
      indicating in the segment information entry for the full segment assigned to a thread that the segment is assigned to the free segment list, wherein data in the full segment indicated in the free segment list remains available for access until the full segment is reassigned from the free segment list to one of the threads and overwritten; and
      assigning one of the segments in the free segment list, different from the full segment, to the thread.

2. The computer program product of claim 1, wherein the segments associated with threads and indicated in the free segment list comprise segments of data stored in a main buffer, wherein the operations further comprise:
   processing the segments in the main buffer to provide information on data written to the segments.

3. The computer program product of claim 2, wherein the threads write trace data to the segments stored in the main buffer to which they are assigned, wherein each written instance of the trace data includes a timestamp, a thread identifier of a thread writing the trace data, wherein the operations further comprise
   sorting the trace data in the segments in the main buffer by the timestamp to enable a user to search by the thread identifier of the sorted trace data.

4. The computer program product of claim 1, wherein the thread to which the full segment is assigned performs the operations of indicating the full segment in the free segment list and assigning one of the segments in the free segment list to the thread, wherein the full segment is not assigned to the segment after indicating the full segment in the free segment list and assigning one of the segments in the free segment list to the thread.

5. The computer program product of claim 4, wherein there is a lock for the free segment list, wherein the operations performed by the thread to which the full segment is assigned comprises:
   obtaining the lock in response to the lock being available, wherein the operations of indicating the full segment in the free segment list and assigning one of the segments in the free segment list to the thread are performed in response to the thread obtaining the lock; and
   releasing the lock in response to performing the operations of indicating the full segment in the free segment list and assigning one of the segments in the free segment list to the thread.

6. The computer program product of claim 1, wherein the free segment list comprises a First-in-First-Out (FIFO) list, wherein the segment from the free segment list to assign to the thread is selected from a first end of the FIFO list having oldest data to replace the full segment, and wherein the full segment is added to a second end of the FIFO list having newest data in the FIFO list.

7. The computer program product of claim 1, wherein the indicating the full segment in the free segment list comprises updating the segment information entry for the full segment to indicate the full segment as assigned to the free segment list to replace the assignment to the thread, and wherein the assigning of one of the segments in the free segment list to the thread comprises updating the segment information entry for the segment assigned from the free segment list to indicate the segment as assigned to the thread.

8. A system, comprising:
   at least one processor;
   a memory;
   a computer readable storage medium having computer readable program code embodied therein that when executed by the at least one processor performs operations, the operations comprising:
      providing segment information entries in the memory for segments in a buffer;
      providing an assignment of each of a plurality of threads to one of a plurality of segments in the buffer, wherein the threads write to the segment to which they are assigned;
      indicating segments in a free segment list which are not assigned to one of the threads, wherein each segment information entry of the segment information entries in the memory, for each of the segments indicted in the free segment list, indicates that the segment is assigned to the free segment list and a buffer location at which the segment is stored in the buffer; and
      in response to one of the segments assigned to one of the threads becoming a full segment having less than a threshold amount of free space, performing:
         indicating in the segment information entry for the full segment assigned to a thread that the segment is assigned to the free segment list, wherein data in the full segment indicated in the free segment list remains available for access until the full segment is reassigned from the free segment list to one of the threads and overwritten; and
         assigning one of the segments in the free segment list, different from the full segment, to the thread.

9. The system of claim 8, wherein the segments associated with threads and indicated in the free segment list comprise segments of data stored in a main buffer, wherein the operations further comprise:
   processing the segments in the main buffer to provide information on data written to the segments.

10. The system of claim 9, wherein the threads write trace data to the segments stored in the main buffer to which they are assigned, wherein each written instance of the trace data includes a timestamp, a thread identifier of a thread writing the trace data, wherein the operations further comprise
sorting the trace data in the segments in the main buffer by the timestamp to enable a user to search by the thread identifier of the sorted trace data.

11. The system of claim 8, wherein the thread to which the full segment is assigned performs the operations of indicating the full segment in the free segment list and assigning one of the segments in the free segment list to the thread, wherein the full segment is not assigned to the segment after indicating the full segment in the free segment list and assigning one of the segments in the free segment list to the thread.

12. The system of claim 11, wherein there is a lock for the free segment list, wherein the operations performed by the thread to which the full segment is assigned comprises:
obtaining the lock in response to the lock being available, wherein the operations of indicating the full segment in the free segment list and assigning one of the segments in the free segment list to the thread are performed in response to the thread obtaining the lock; and
releasing the lock in response to performing the operations of indicating the full segment in the free segment list and assigning one of the segments in the free segment list to the thread.

13. The system of claim 8, wherein the indicating the full segment in the free segment list comprises updating the segment information entry for the full segment to indicate the full segment as assigned to the free segment list to replace the assignment to the thread, and wherein the assigning of one of the segments in the free segment list to the thread comprises updating the segment information entry for the segment assigned from the free segment list to indicate the segment as assigned to the thread.

14. A method for managing data written by multiple threads executed by at least one processing unit in a computing system, comprising:
providing segment information entries in a memory for segments in a buffer;
providing an assignment of each of a plurality of threads to one of a plurality of segments in the buffer, wherein the threads write to the segment to which they are assigned;
indicating segments in a free segment list which are not assigned to one of the threads, wherein each segment information entry of the segment information entries in the memory, for each of the segments indicted in the free segment list, indicates that the segment is assigned to the free segment list and a buffer location at which the segment is stored in the buffer; and
in response to one of the segments assigned to one of the threads becoming a full segment having less than a threshold amount of free space, performing:
indicating in the segment information entry for the full segment assigned to a thread that the segment is assigned to the free segment list, wherein data in the full segment indicated in the free segment list remains available for access until the full segment is reassigned from the free segment list to one of the threads and overwritten; and
assigning one of the segments, different from the full segment, in the free segment list to the thread.

15. The method of claim 14, wherein the segments associated with threads and indicated in the free segment list comprise segments of data stored in a main buffer, further comprising:
processing the segments in the main buffer to provide information on data written to the segments.

16. The method of claim 15, wherein the threads write trace data to the segments stored in the main buffer to which they are assigned, wherein each written instance of the trace data includes a timestamp, a thread identifier of a thread writing the trace data, further comprising:
sorting the trace data in the segments in the main buffer by the timestamp to enable a user to search by the thread identifier of the sorted trace data.

17. The method of claim 14, wherein the thread to which the full segment is assigned performs the indicating the full segment in the free segment list and assigning one of the segments in the free segment list to the thread, wherein the full segment is not assigned to the segment after indicating the full segment in the free segment list and assigning one of the segments in the free segment list to the thread.

18. The method of claim 17, wherein there is a lock for the free segment list, wherein the thread to which the full segment is assigned further performs:
obtaining the lock in response to the lock being available, wherein the indicating the full segment in the free segment list and assigning one of the segments in the free segment list to the thread are performed in response to the thread obtaining the lock; and
releasing the lock in response to performing the indicating the full segment in the free segment list and assigning one of the segments in the free segment list to the thread.

19. The method of claim 14, wherein the indicating the full segment in the free segment list comprises updating the segment information entry for the full segment to indicate the full segment as assigned to the free segment list to replace the assignment to the thread, and wherein the assigning of one of the segments in the free segment list to the thread comprises updating the segment information entry for the segment assigned from the free segment list to indicate the segment as assigned to the thread.

* * * * *